US007651212B2

(12) United States Patent
Kadomatsu et al.

(10) Patent No.: US 7,651,212 B2
(45) Date of Patent: Jan. 26, 2010

(54) IMAGE FORMING APPARATUS AND IMAGE FORMING METHOD

(75) Inventors: Tetsuzo Kadomatsu, Kanagawa (JP); Masaaki Konno, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 297 days.

(21) Appl. No.: 11/336,994

(22) Filed: Jan. 23, 2006

(65) Prior Publication Data

US 2006/0164487 A1 Jul. 27, 2006

(30) Foreign Application Priority Data

Jan. 24, 2005 (JP) ............................ 2005-015798

(51) Int. Cl.

| | |
|---|---|
| ***B41J 2/01*** | (2006.01) |
| ***G01D 11/00*** | (2006.01) |
| ***B41J 2/015*** | (2006.01) |
| ***B41J 2/165*** | (2006.01) |
| ***B41J 2/17*** | (2006.01) |

(52) U.S. Cl. ....................... 347/102; 347/101; 347/100; 347/21; 347/31; 347/84

(58) Field of Classification Search ................. 347/102, 347/21, 31, 84, 96, 98, 100, 103, 8, 104
See application file for complete search history.

(56) References Cited

U.S. PATENT DOCUMENTS

| | | | | |
|---|---|---|---|---|
| 5,365,261 | A * | 11/1994 | Ozawa et al. | 347/103 |
| 5,786,835 | A * | 7/1998 | Ikeda et al. | 347/106 |
| 5,940,092 | A * | 8/1999 | Kashimura et al. | 347/8 |
| 6,084,620 | A * | 7/2000 | Morikawa et al. | 347/96 |
| 6,412,934 | B1 * | 7/2002 | Moriyama et al. | 347/96 |
| 6,514,328 | B1 * | 2/2003 | Katoh et al. | 106/31.28 |
| 6,716,562 | B2 * | 4/2004 | Uehara et al. | 430/125.3 |
| 6,719,423 | B2 * | 4/2004 | Chowdry et al. | 347/103 |
| 7,352,502 | B2 * | 4/2008 | Miyazaki et al. | 359/296 |

FOREIGN PATENT DOCUMENTS

| | | | |
|---|---|---|---|
| JP | 05307342 | A * | 11/1993 |
| JP | 07261470 | A * | 10/1995 |
| JP | 11320834 | A * | 11/1999 |
| JP | 2001179959 | A * | 7/2001 |
| JP | 2003-136697 | A | 5/2003 |

* cited by examiner

*Primary Examiner*—Stephen D Meier
*Assistant Examiner*—Leonard S Liang
(74) *Attorney, Agent, or Firm*—Birch, Stewart, Kolasch & Birch, LLP

(57) ABSTRACT

The image forming apparatus comprises: an ink ejection device which ejects a droplet of radiation-curable ink onto a recording medium; a solvent separating device which separates a coloring material component and a solvent component in the droplet of the radiation-curable ink on the recording medium; a solvent removing device which removes the solvent component separated by the solvent separating device; and a curing device which irradiates radiation onto the droplet of the radiation-curable ink after the solvent component is removed by the solvent removing device, in such a manner that the droplet of the radiation-curable ink is cured.

9 Claims, 10 Drawing Sheets

IMAGE FORMING APPARATUS AND IMAGE FORMING METHOD

BACKGROUND OF THE INVENTION

1. Field of the Invention

The present invention relates to an image forming apparatus and image forming method, and more particularly, to technology for reducing relief effects by leveling the thickness of ink ejected as droplets onto a recording medium by an inkjet printer system using radiation-curable ink.

2. Description of the Related Art

An inkjet recording apparatus (inkjet printer) having an inkjet head (ink ejection head) in which a plurality of nozzles are arranged, is known as image forming apparatuses. An inkjet recording apparatus of this kind forms images by forming dots on a recording medium, by ejecting ink in the form of droplets from nozzles, while causing the inkjet head and the recording medium to move relatively to each other.

As inks used in inkjet printers, there are radiation-curable inks, which are cured by receiving radiation, such as ultraviolet (LV) light, an electron beam (EB), or the like. A radiation-curable ink includes, for example, a coloring material, a polymerizing monomer or oligomer, a polymerization initiator and a polymerization promoter which promote a bridging reaction or polymerization reaction of the monomer or oligomer with a photocatalytic reaction, and the like. Therefore, when irradiated with radiation, the radiation-curable ink hardens due to the bridging reaction or polymerization reaction.

In an inkjet printer system that uses a radiation-curable ink of this kind, usually, all of the solvent component is cured. Thus, the print regions on the recording medium stand out in a projecting shape and become fixed onto the recording medium while creating relief effects (step difference) on the printed object. This can be problematic, depending on the intended use of the printed object.

On the other hand, it is known that the thickness of ink droplets deposited on a recording medium by an inkjet recording apparatus using radiation-curable ink can be adjusted in such a manner that desirable print quality and storage properties are obtained (see, for example, Japanese Patent Application Publication No. 2003-136697).

This technique relates to a recording apparatus which combines an inkjet recording apparatus using radiation-curable ink for recording variable information and an image forming apparatus based on another system for recording non-variable information. As a method for adjusting the thickness of the ink droplets deposited by the inkjet recording apparatus, the technique adopts ink thickness control by means of polishing, pressurization, heating, or an auxiliary light exposure device.

However, there is a possibility that the recording apparatus according to Japanese Patent Application Publication No. 2003-136697 has the following problems. More specifically, the applicable image recording apparatus is limited to being the recording apparatus that includes an inkjet recording apparatus and an image forming apparatus based on another system.

Moreover, if the method for adjusting the thickness of the ink droplets deposited by the inkjet recording apparatus is based on polishing, then there is a possibility of reducing print density due to removal of necessary coloring material, and there is also a possibility that the image is soiled by the occurrence of powder caused by the polishing.

Further, if the thickness of the ink droplets is adjusted by pressurization, then the dot diameter and the line width of ink, and the like, can expand, and this leads to a decline in density and resolution. Furthermore, if the thickness of the ink droplets is adjusted by heating, then the diameter and the line width of the ink droplets, and the like, can expand, and this leads to a decline in density and resolution.

Furthermore, the method for adjusting the thickness of the ink droplets by means of an auxiliary exposure device increases the thickness of the ink, in order to match the thickness of a non-variable information section. Therefore, it cannot be used with the object of leveling the ink droplets and removing projecting shapes therein by reducing the thickness of the ink.

SUMMARY OF THE INVENTION

The present invention has been contrived in view of the foregoing circumstances, an object thereof being to provide an image forming apparatus and an image forming method that can reduce relief effects by leveling the thickness of ink droplets ejected onto a recording medium in an inkjet printer system using radiation-curable ink.

In order to attain the aforementioned object, the present invention is directed to an image forming apparatus, comprising: an ink ejection device which ejects a droplet of radiation-curable ink onto a recording medium; a solvent separating device which separates a coloring material component and a solvent component in the droplet of the radiation-curable ink on the recording medium; a solvent removing device which removes the solvent component separated by the solvent separating device; and a curing device which irradiates radiation onto the droplet of the radiation-curable ink after the solvent component is removed by the solvent removing device, in such a manner that the droplet of the radiation-curable ink is cured.

According to this aspect of invention, the amount of solvent in the ink droplet on the recording medium is reduced. Hence, it is possible to reduce the thickness of the ink and to obtain a flat printed object, without reducing the print density or the image resolution due to broadening of the dot diameters and/or line widths, and therefore, relief effects can be reduced.

Preferably, the solvent removing device comprises a porous member which absorbs the solvent component. According to this aspect, the solvent component can be quickly removed, and the structure can be simple and inexpensive.

Preferably, the image forming apparatus further comprises a solvent removal amount control device which controls an amount of the solvent component removed by the solvent removing device. According to this aspect, the solvent component can be appropriately removed depending on the type of recording medium and the ink ejection volume, and therefore, relief effects can be reliably reduced.

Preferably, the solvent removal amount control device controls a distance between the solvent removing device and the recording medium.

Alternatively, it is also preferable that the solvent removal amount control device controls a contact pressure between the solvent removing device and the recording medium.

Alternatively, it is also preferable that the solvent removal amount control device controls at least one of a contact length and a contact duration between the solvent removing device and the recording medium.

According to these aspects, the controllability of the thickness of the image forming layer formed by the ink on the recording medium can be improved.

Preferably, the solvent separating device forms aggregate of the coloring material in the droplet of the radiation-curable ink on the recording medium, by means of a two-liquid reaction. According to this aspect, the solvent component can be quickly separated, and it is possible to remove the solvent component only, in a reliable fashion.

Alternatively, it is also preferable that the solvent separating device separates the coloring material component and the solvent component, by using an electrophoresis effect. According to this aspect, the solvent component can be separated without using a treatment liquid, and adhesion of the coloring material component to the solvent removing device during removal of the solvent ca be effectively prevented.

In order to attain the aforementioned object, the present invention is also directed to an image forming method, comprising the steps of: ejecting a droplet of radiation-curable ink onto a recording medium; separating a coloring material component and a solvent component in the droplet of the radiation-curable ink on the recording medium; removing the solvent component separated in the separating step; and irradiating radiation onto the droplet of the radiation-curable ink after the removing step, in such a manner that the droplet of the radiation-curable ink is cured.

According to this aspect of the invention, the thickness of the ink can be reduced and a flat printed object can be effectively obtained, without reducing the print density or the image resolution due to broadening of the dot diameters and/or line widths. Therefore, relief effects can be reduced.

Preferably, the image forming method further comprises the steps of: gathering the solvent component removed in the removing step; and adding a coloring material component to the solvent component gathered in the gathering step for reusing for new ink.

According to this aspect, costs can be reduced by reusing monomer, which is relatively expensive, and the production of unwanted waste liquid is avoidable.

According to an image forming apparatus and an image forming method based of the present invention, the amount of solvent in the ink droplets on the recording medium is reduced. Therefore, it is possible to reduce the thickness of the ink and to obtain a flat printed object, without reducing the print density or the image resolution due to broadening of the dot diameters or line widths, and relief effects can be eliminated.

BRIEF DESCRIPTION OF THE DRAWINGS

The nature of this invention, as well as other objects and benefits thereof, will be explained in the following with reference to the accompanying drawings, wherein.

DETAILED DESCRIPTION OF THE PREFERRED EMBODIMENTS

Figure 1:
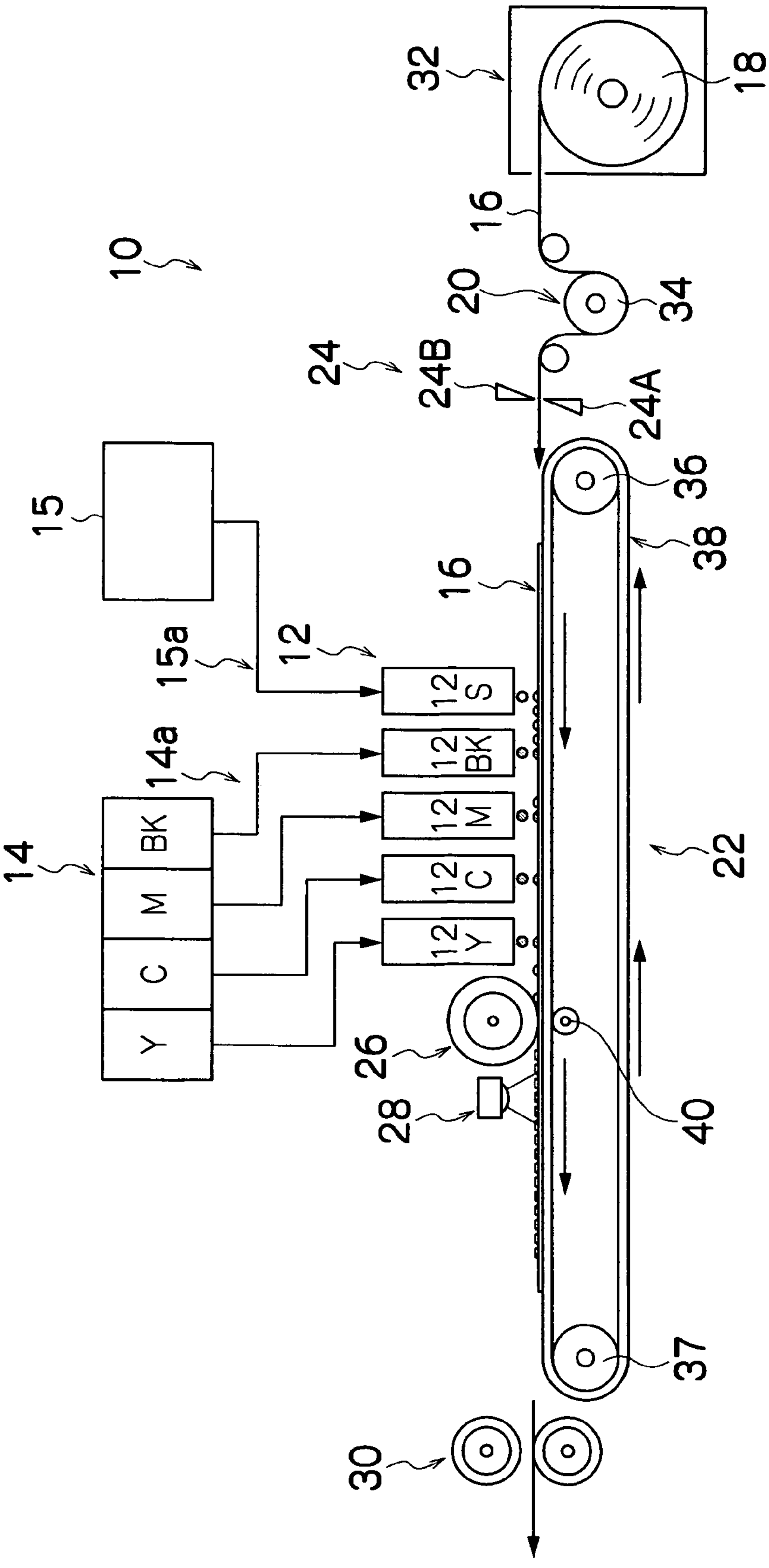
FIG. 1 is a general compositional diagram showing an schematic view of a first embodiment of an inkjet recording apparatus forming an image forming apparatus relating to the present invention.

FIG. 1 is a general compositional diagram showing an outline of a first embodiment of an inkjet recording apparatus forming an image forming apparatus relating to the present invention. In the present embodiment, coloring material and solvent are separated by causing a reaction between a radiation-curable ink and a treatment liquid, the solvent portion is eliminated and the remaining material is fixed by irradiation of radiation, and hence the ink droplets on a recording medium is leveled.

For this purpose, as shown in FIG. 1, the inkjet recording apparatus 10 according to the present embodiment has a print unit 12 including a plurality of print heads (ink heads) 12 BK, 12M, 12C and 12Y provided for respective ink colors, and a treatment liquid head 12S, which ejects the treatment liquid.

Furthermore, the inkjet recording apparatus 10 also comprises an ink storing and loading unit 14, which stores inks of respective colors (BK (black), M (magenta), C (cyan) and Y (yellow)) to be supplied to the respective print heads 12BK, 12M, 12C and 12Y, and a treatment liquid tank 15, which stores the treatment liquid to be supplied to the treatment liquid head 12S. The inks used here are radiation-curable inks, which are cured by irradiation of radiation, such as ultraviolet (UV) light or electron beam (EB), or the like, as described above. The treatment liquid generates aggregate of the ink coloring material by reacting with the ink, and thereby separates the coloring material and the solvent.

A paper supply unit 18 for supplying recording paper 16 and a decurling unit 20 for removing curl from the recording paper 16 are provided. Furthermore, a belt conveyance unit 22 for conveying recording paper 16 from the paper supply unit 18 to the print unit 12 while the recording paper 16 is kept flat is also provided. The belt conveyance unit 22 is disposed so as to be opposed to the nozzle surface of the print unit 12 (the ink or treatment liquid ejection surface of the respective heads).

Moreover, a cutter 24 for cutting the recording paper 16 to a prescribed length is provided between the decurling unit 20 and the belt conveyance unit 22. A porous roller 26 for absorbing and removing the solvent separated from the ink, and a radiation light source 28 for curing the radiation-curable ink are disposed at the places after the print unit 12.

Furthermore, a paper output unit 30 for outputting recorded paper (a printed object) to the exterior is provided after the belt conveyance unit 22.

The ink storing and loading unit 14 has ink tanks for storing the inks of colors corresponding to the print heads 12BK, 12M, 12C and 12Y, and the tanks are connected to the corresponding heads 12BK, 12M, 12C and 12Y via prescribed channels 14*a*. The ink storing and loading unit 14 also comprises a warning device, such as a display device and/or an alarm sound generator for warning when the remaining amount of ink has become low, and has a mechanism for preventing loading errors among the colors. Furthermore, the treatment liquid tank 15 is similarly connected to the treatment liquid head 12S via a prescribed channel 15*a*, and also comprises a device for issuing a warning when the remaining amount of treatment liquid has become low.

Although the paper supply unit 18 is shown as comprising a magazine 32 for rolled paper (continuous paper) in the example shown in FIG. 1, a plurality of magazines with papers different in specifications, such as paper width and quality, may be provided. Moreover, papers may be supplied from cassettes which contain cut paper loaded in layers and which are used jointly or in lieu of the magazine 32 for rolled paper.

If a composition is adopted in which a plurality of types of recording paper 16 can be used, then it is desirable to attach an information recording body, such as a barcode, radio tag, or the like, which records various types of information on the recording paper 16, to the magazine. In this case, it is possible to automatically determine the type of recording paper 16 used by reading the information recorded on the information recording body with the prescribed reading device. In this case, desirably, the ink ejection is controlled in such a manner that suitable ink ejection is achieved depending on the type of recording paper 16.

The recording paper 16 delivered from the paper supply unit 18 retains curl due to having been loaded in the magazine 32. In order to remove the curl, heat is applied to the recording paper 16 by a heating drum 34 in the decurling unit 20, in the direction opposite to the curl direction in the magazine 32. In this case, desirably, the heating temperature is adjusted in such a manner that the print surface of the recording paper 16 is curled slightly towards the outside.

As shown in FIG. 1, in the case of the configuration in which roll paper is used, a cutter 24 is provided, and the continuous paper is cut into a desired size by the cutter 24. The cutter 24 has a stationary blade 24A, of which length is not less than the width of the conveyor pathway of the recording paper 16, and a round blade 24B, which moves along the stationary blade 24A. The stationary blade 24A is disposed on the reverse side of the printed surface of the recording paper 16, and the round blade 24B is disposed on the printed surface side across the conveyor pathway. When only cut papers are used, the cutter 24 is not required.

After decurling in the decurling unit, the cut recording paper 16 is delivered to the belt conveyance unit 22. The belt conveyance unit 22 has a structure in which an endless conveyance belt (electrostatic suction belt) 38 is wound around two rollers 36 and 37. The belt conveyance unit 22 is composed in such a manner that at least the portion thereof which opposes the nozzle surface of each of heads 12BK, 12M, 12C and 12Y and 12S forms a flat surface.

The conveyance belt 38 is an electrostatic suction belt, which conveys the recording paper 16 while suctioning and fixing the recording paper 16 by an electrostatic force onto the surface of the conveyance belt 38. The conveyance belt 38 is made from a conducting material, and is electrically connected to a DC (Direct Current) power supply (not shown).

By transmitting the driving force of a motor 94 (not shown in FIG. 1, but shown in FIG. 6) to at least one of the rollers 36 and 37, around which the conveyance belt 38 is wound, the conveyance belt 38 is driven in the counterclockwise direction in FIG. 1. By this means, the recording paper 16 is held on the conveyance belt 38 and is conveyed from right to left in FIG. 1.

The print heads 12BK, 12M, 12C and 12Y are full line heads having a length corresponding to the maximum width of the recording paper 16 used in the inkjet recording apparatus 10, and comprising a plurality of nozzles for ejecting ink arranged on a nozzle face to correspond with a length exceeding at least one side of the maximum-size recording paper 16 (the full width of the printable range). Furthermore, the treatment liquid head 12S is a full line head similar to the print heads.

As shown in FIG. 1, the print heads 12BK, 12M, 12C and 12Y are arranged in color order (black (BK), magenta (M), cyan (C), and yellow (Y)) from the upstream side in the conveyance direction of the recording paper 16, and these respective print heads 12BK, 12M, 12C and 12Y are fixed so as to extend in a direction (the main scanning direction) which is substantially perpendicular to the conveyance direction of the recording paper 16 (the sub-scanning direction).

The print unit 12, in which the full-line heads covering the entire width of the paper are thus provided for the respective ink colors, can record an image over the entire surface of the recording paper 16 by performing the action of moving the recording paper 16 and the print unit 12 relatively to each other in the paper conveyance direction (sub-scanning direction) just once (in other words, by means of a single subscan). Higher-speed printing is thereby made possible and productivity can be improved in comparison with a shuttle type head configuration in which a recording head reciprocates in a direction (main scanning direction) which is perpendicular to the paper conveyance direction (sub-scanning direction).

The terms "main scanning direction" and "sub-scanning direction" here are used in the following senses. More specifically, in a full-line head comprising rows of nozzles that have a length corresponding to the entire width of the recording paper, "main scanning" is defined as printing one line (a line formed of one row of dots, or a line formed of a plurality of rows of dots) in the width direction of the recording paper (the direction perpendicular to the conveyance direction of the recording paper) by driving the nozzles in one of the following ways: (1) simultaneously driving all the nozzles; (2) sequentially driving the nozzles from one side toward the other side; and (3) dividing the nozzles into blocks and sequentially driving the blocks of the nozzles from one side toward the other side. The direction indicated by the one line recorded by the main scanning action (the lengthwise direction of the band-shaped region thus recorded) is called the "main scanning direction".

On the other hand, "sub-scanning" is defined as to repeatedly perform printing of one line (a line formed of a row of dots, or a line formed of a plurality of rows of dots) formed by the main scanning, while the full-line head and the recording paper are relatively moved to each other. The direction in which sub-scanning is performed is called the sub-scanning direction. Consequently, the conveyance direction of the recording paper corresponds to the sub-scanning direction, and the direction perpendicular to the sub-scanning direction corresponds to the main scanning direction.

Although a configuration with the four standard colors, K, C, M, and Y, is described in the present embodiment, the combinations of the ink colors and the number of colors are not limited to these. Light and/or dark inks can be added as required, and thus, for example, a configuration is possible in which print heads for ejecting light-colored inks such as light cyan and light magenta are added.

A color image is formed on recording paper 16 by ejecting treatment liquid from the treatment liquid head 12S while the recording paper 16 is conveyed by the belt conveyance unit 22, and then ejecting inks of respective colors from the respective print heads 12BK, 12M, 12C, and 12Y. In this case, the treatment liquid and the ink react together when the two liquids combine on the recording paper 16, thereby aggregate of the coloring material being produced, and hence the ink is separated into the aggregate of the coloring material and the solvent. This reaction of the two liquids is described in detail below.

The porous roller 26 is disposed on the place after the print unit 12, and absorbs and removes the solvent separated from the ink as a result of the reaction between the ink and the treatment liquid. Furthermore, an auxiliary roller 40 is provided on the opposite side of the conveyance belt 38 from the porous roller 26.

A radiation source 28 disposed after the porous roller 26 performs curing by irradiating radiation onto the aggregate of the coloring material and the residual solvent component, which remains on the recording paper 16 after solvent removal. For example, if the ink is a UV-curable ink, then a UV light source is used as the radiation source 28.

In this way, the recording paper 16 on which the solvent has been removed from the ink droplets and the aggregate of coloring material and the remaining solvent component have been cured and leveled, is output from the paper output unit 30 disposed after the belt conveyance unit 22. Although omitted from the drawing, a sorter for colleting and stacking the images according to job orders is provided in the paper output section 30, for example.

Next, the structure of print heads 12BK, 12M, 12C, and 12Y will be described. The print heads 12BK, 12M, 12C, and 12Y of the respective ink colors have the same structure, and a reference numeral 50 is hereinafter designated to any of the print heads.

Figure 2A:
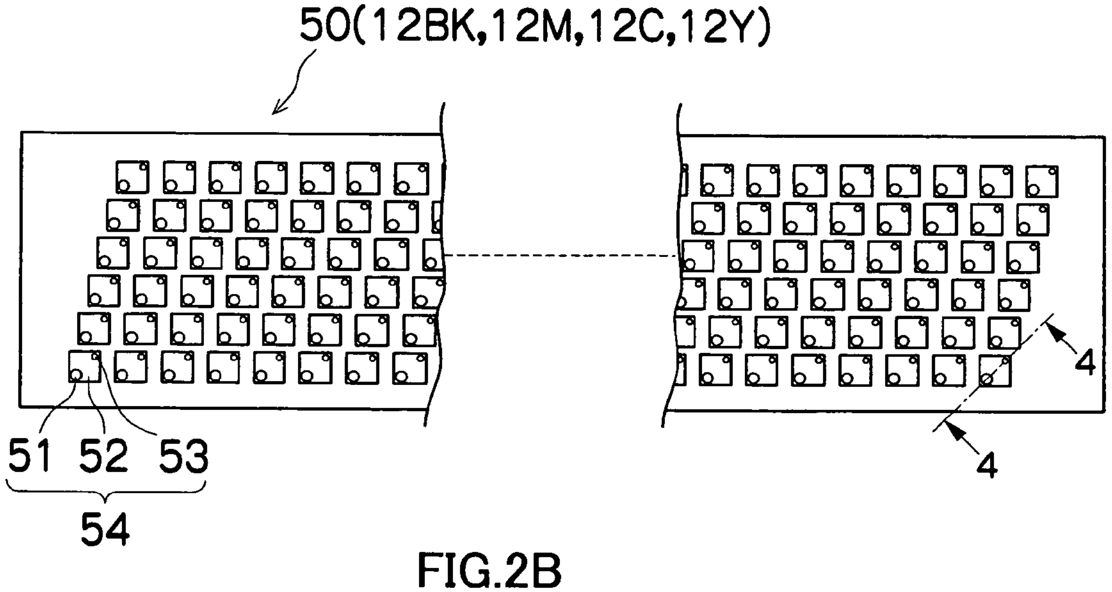
FIG. 2A is a plan view perspective diagram showing an example of the composition of a print head.
Figure 2B:
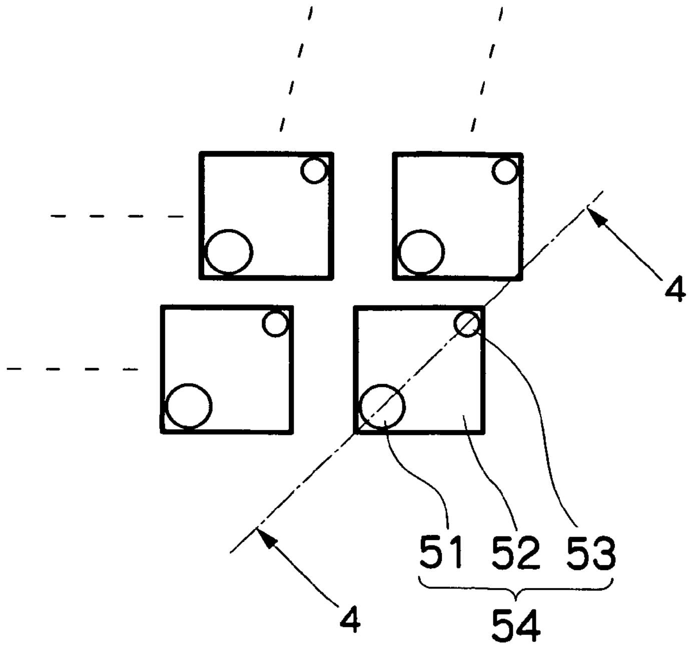
FIG. 2B is an enlarged diagram of a portion of same.

FIG. 2A is a planar perspective diagram showing an example of the composition of the print head 50, and FIG. 2B is an enlarged diagram of a portion of the print head 50.

As shown in FIG. 2A, the print head 50 according to the present embodiment achieves a high-density arrangement of nozzles 51 by using a two-dimensional staggered matrix array of pressure chamber units 54. Each pressure chamber unit 54 includes a nozzle 51 for ejecting ink as ink droplets, a pressure chamber 52 for applying pressure to the ink in order to eject ink, and an ink supply port 53 for supplying ink to the pressure chamber 52 from a common flow channel (not shown in FIG. 2A).

Furthermore, as shown in FIG. 2B, when the pressure chamber 52 is viewed from above, the planar shape thereof is a substantially square shape, and a nozzle 51 is formed at one end of a diagonal of the pressure chamber 52 while a supply port 53 is provided at the other end thereof. The planar shape of the pressure chamber 52 is not limited to being a square shape of this kind.

Figure 3:
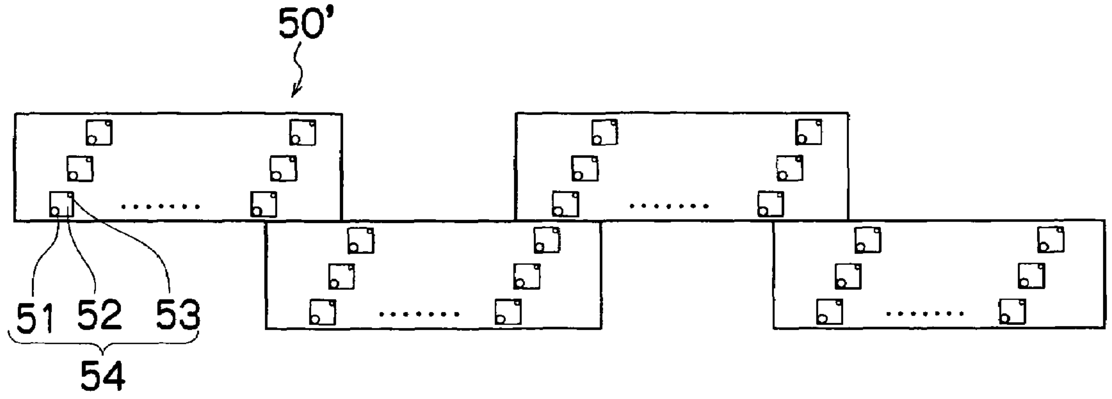
FIG. 3 is a two-dimensional perspective diagram showing a further example of the structure of a print head.

Moreover, FIG. 3 is a planar perspective diagram showing a further example of the structure of the print head. As shown in FIG. 3, one long full line head may be constituted by combining a plurality of short heads 50' arranged in a two-dimensional staggered array, in such a manner that the combined length of this plurality of short heads 50' corresponds to the full width of the print medium.

Figure 4:
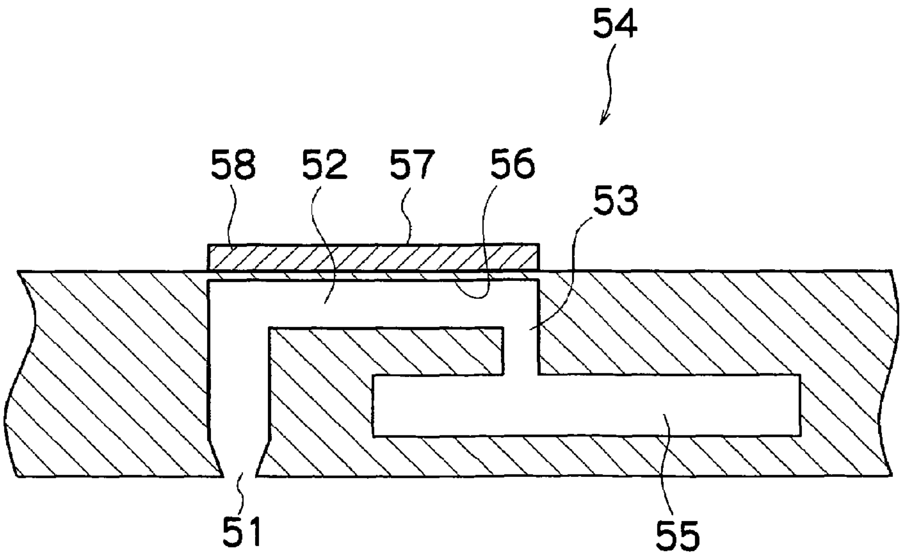
FIG. 4 is a cross-sectional diagram along line 4-4 in FIGS. 2A and 2B.

FIG. 4 is a cross-sectional diagram along line 4-4 in FIGS. 2A and 2B, and shows a side cross-section of one pressure chamber unit 54.

As shown in FIG. 4, each pressure chamber 52 is connected to a nozzle 51, and is also connected to a common flow passage 55 via the supply port 53. The common flow passage 55 is connected to the ink tank of the ink storing and loading unit 14, which functions as an ink supply source. The ink supplied from the ink tank is distributed and supplied to the respective pressure chambers 52 via the common flow passage 55.

The ceiling faces of the pressure chambers 52 are constituted by a thin diaphragm 56, and piezoelectric elements (piezoelectric actuators) 58 provided with individual electrodes 57 are bonded to the diaphragm 56. The diaphragm 56 also serves as a common electrode, and by applying a drive voltage to the individual electrode 57 and the common electrode (diaphragm) 56, the piezoelectric element 58 is deformed and the volume of the pressure chamber 52 changes. The pressure of the ink inside the pressure chamber 52 changes due to the change in the volume of the pressure chamber 52, thereby causing the ink to be ejected from the nozzle 51. After ink is ejected, new ink flows into the pressure chamber 52 from the common flow channel 55 via the supply port 53 and the pressure chamber 52 is filled with the ink, in preparation for the next ejection.

Figure 5:
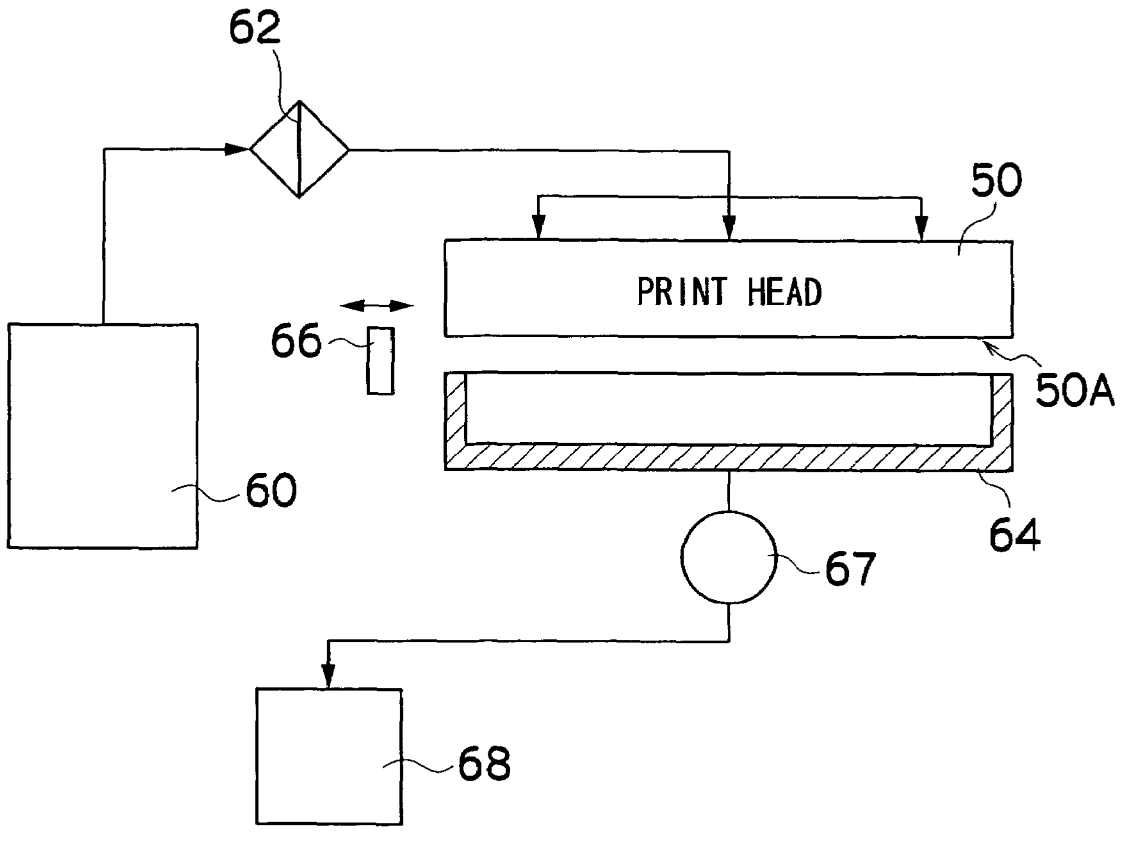
FIG. 5 is a schematic diagram showing an ink supply system in the inkjet recording apparatus according to the first embodiment.

FIG. 5 is a schematic drawing showing the configuration of the ink supply system in the inkjet recording apparatus 10. The ink tank 60 is a base tank that supplies ink to the print head 50 and is set in the ink storing and loading unit 14 described with reference to FIG. 1. The types of the ink tank 60 include a refillable type and a cartridge type: when the remaining amount of ink is low, the ink tank 60 of the refillable type is filled with ink through a filling port (not shown) and the ink tank 60 of the cartridge type is replaced with a new one. When the ink type is changed depending on the intended application, the cartridge type is suitable. In this case, it is preferable to identify the ink type information with a bar code or the like, and to perform ejection control depending on the ink type.

A filter 62 for removing foreign matters and bubbles is disposed in the middle of the channel connecting the ink tank 60 and the print head 50, as shown in FIG. 5. The filter mesh size in the filter 62 is preferably equivalent to or less than the diameter of the nozzle of the print head 50 and commonly about 20 μm.

Although not shown in FIG. 5, it is preferable to provide a sub-tank integrally to the print head 50 or in the vicinity of the print head 50. The sub-tank has a damper function for preventing variation in the internal pressure of the head and a function for improving refilling in the print head.

The inkjet recording apparatus 10 is also provided with a cap 64 as a device to prevent the nozzles 51 from drying out and/or to prevent an increase in the ink viscosity in the vicinity of the nozzles 51, and a cleaning blade 66 as a device to clean the nozzle face 50A.

A maintenance unit including the cap 64 and the cleaning blade 66 can be moved relatively with respect to the print head 50 by a movement mechanism (not shown), and is moved from a predetermined holding position to a maintenance position below the print head 50 as required.

The cap 64 is displaced upward and downward relatively with respect to the print head 50 by an elevator mechanism (not shown). When the power of the inkjet recording apparatus 10 is switched off or when the apparatus is in a standby state for printing, the elevator mechanism raises the cap 64 to a predetermined elevated position so as to be in close contact with the print head 50, and the nozzle region of the nozzle surface 50A is thereby covered by the cap 64.

The cleaning blade 66 is composed of rubber or another elastic member, and can slide on the ink ejection surface (nozzle surface 50A) of the print head 50 by means of a blade movement mechanism (not shown). If there are ink droplets or foreign matter adhering to the nozzle surface 50A, then the nozzle surface 50A is wiped by causing the cleaning blade 66 to slide over the nozzle surface 50A, thereby cleaning same.

During printing or standby, if the use frequency of a particular nozzle 51 has declined and the ink viscosity in the vicinity of the particular nozzle 51 has increased, then a preliminary ejection is performed toward the cap 64, in order to remove the ink that has degraded as a result of increasing in viscosity.

Also, when bubbles have become intermixed in the ink inside the print head 50 (the ink inside the pressure chamber 52), the cap 64 is placed on the print head 50, the ink inside the pressure chamber 52 (the ink in which bubbles have become intermixed) is removed by suction with a suction pump 67, and the suction-removed ink is sent to a collection tank 68. This suction action is performed also when ink is initially loaded into the head, and when service has started after a long period of being stopped, in order to suction-remove the hardened and degraded ink of which viscosity has increased.

When a state in which ink is not ejected from the print head 50 continues for a certain amount of time or longer, the ink solvent in the vicinity of the nozzles 51 evaporates and ink viscosity increases. In such a state, ink can no longer be ejected from the nozzle 51 even if a pressure generating device (not shown, described below) for the ejection driving is operated. Before reaching such a state (i.e. within a viscosity range that allows ejection by the operation of the pressure generating device), the pressure generating device is operated to perform the preliminary discharge to eject the ink of which viscosity has increased in the vicinity of the nozzle toward the ink receptor. After the nozzle face 50A is cleaned by a wiper such as the cleaning blade 66 provided as the cleaning device for the nozzle face 50A, a preliminary discharge is also carried out in order to prevent the foreign matter from becoming mixed inside the nozzles 51 by the wiper sliding operation. The preliminary discharge is also referred to as “dummy discharge”, “purge”, “liquid discharge”, and so on.

When bubbles have become intermixed in the nozzle 51 or the pressure chamber 52, or when the ink viscosity inside the nozzle 51 has increased over a certain level, ink can no longer be ejected by the preliminary discharge. In light of this, the suctioning action is carried out as described above.

More specifically, when bubbles have become intermixed into the ink inside the nozzles 51 and the pressure chambers 52, or when the viscosity of the ink in the nozzle 51 has increased to a certain level or more, ink can no longer be ejected from the nozzles even if the pressure generating devices are operated. In a case of this kind, the cap 64 is placed on the nozzle surface 50A of the print head 50, and the ink containing air bubbles or the ink of increased viscosity inside the pressure chambers 52 is suctioned by the pump 67.

However, this suction action is performed with respect to all of the ink in the pressure chambers 52, and therefore the amount of ink consumption is considerable. Consequently, it is desirable that a preliminary ejection is carried out while the increase in viscosity is still minor, if possible. The cap 64 shown in FIG. 5 functions as a suctioning device and it may also function as an ink receptacle for preliminary ejection.

Moreover, desirably, the inside of the cap 64 is divided by means of partitions into a plurality of areas corresponding to the nozzle rows, thereby achieving a composition in which suction can be performed selectively in each of the demarcated areas, by means of a selector, or the like.

Figure 6:
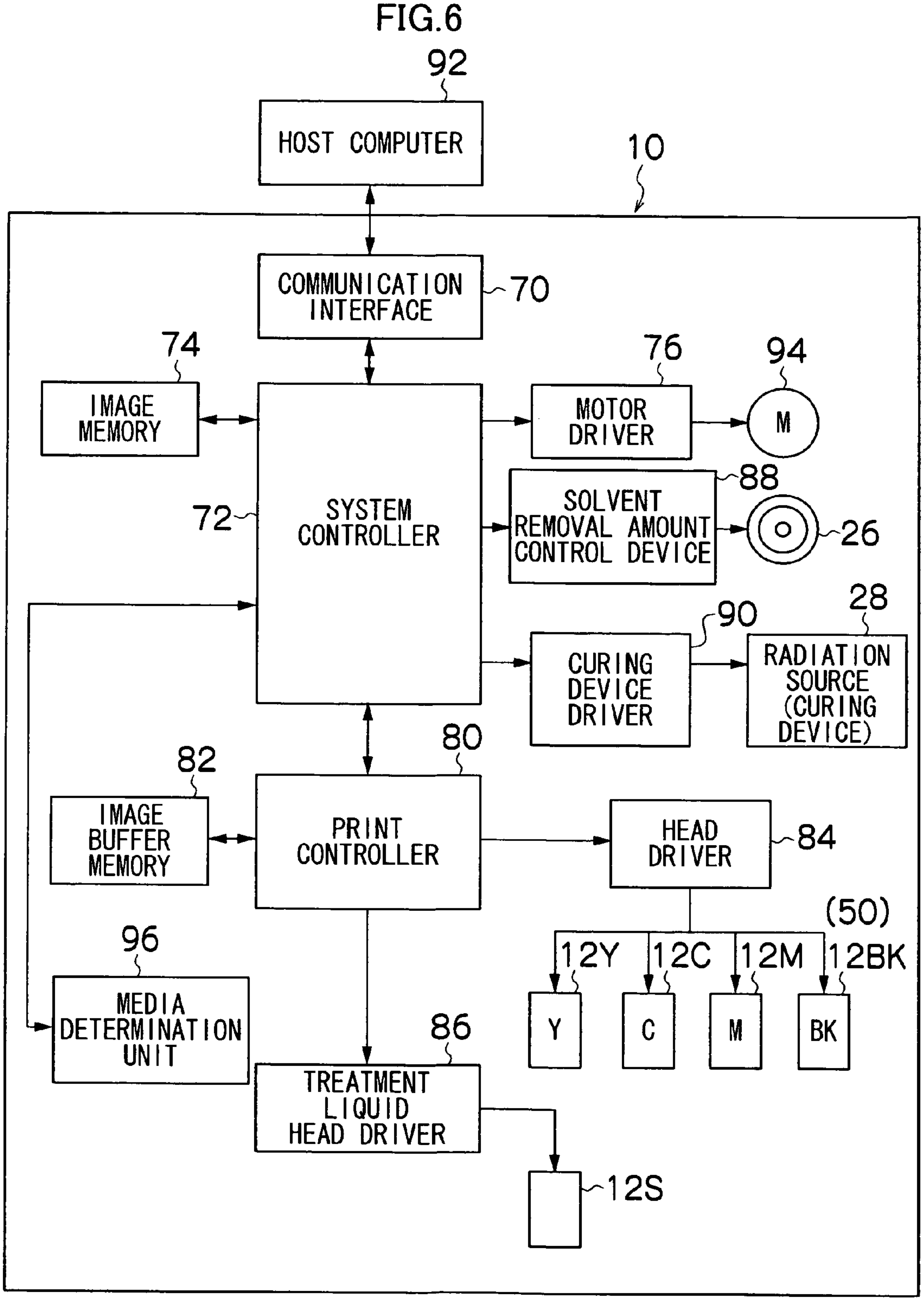
FIG. 6 is a schematic block diagram showing the control system of an inkjet recording apparatus according to the first embodiment.

FIG. 6 is a principal block diagram showing the system configuration (control system) of the inkjet recording apparatus 10.

In FIG. 6, the inkjet recording apparatus 10 comprises a communications interface 70, a system controller 72, a image memory 74, a motor driver 76, a print controller 80, an image buffer memory 82, a head driver 84, a treatment liquid head driver 86, a solvent removal amount control device 88, a curing device driver 90, and the like.

The communication interface 70 is an interface unit for receiving image data sent from a host computer 92. A serial interface such as USB, IEEE1394, Ethernet, and wireless network, or a parallel interface such as a Centronics interface may be used as the communication interface 70. A buffer memory (not shown) may be mounted in this portion in order to increase the communication speed.

The image data sent from the host computer 92 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to a memory composed of semiconductor elements, and a hard disk drive or another magnetic medium may be used as the image memory 74.

The system controller 72 is a control unit for controlling the various sections, such as the communications interface 70, image memory 74, motor driver 76, solvent removal amount control device 88, curing device driver 90, and the like. The system controller 72 is constituted by a central processing unit (CPU), peripheral circuits thereof, and the like. In addition to controlling communications with the host computer 92, controlling reading and writing from and to the image memory 74, and the like, the system controller 72 also generates a control signal for controlling the motor 94 of the conveyance system.

The motor driver 76 is a driver (drive circuit) which drives the motor 94 in accordance with instructions from the system controller 72. The curing device driver 90 is a driver which drives the radiation source 28 forming a curing device in accordance with instructions from the system controller 72.

The print controller 80 has a signal processing function for performing various tasks, compensations, and other types of processing for generating print control signals from the image data stored in the image memory 74 in accordance with commands from the system controller 72 so as to supply the generated print control signal (print data) to the head driver 84. Prescribed signal processing is carried out in the print controller 80, and the ejection amount and the ejection timing of the ink droplets from the respective print heads 50 are controlled via the head driver 84, on the basis of the print data. By this means, prescribed dot size and dot positions can be achieved.

The print controller 80 is provided with the image buffer memory 82. Image data, parameters, and other data are temporarily stored in the image buffer memory 82 when image data is processed in the print controller 80. Although the mode shown in FIG. 6 is one in which the image buffer memory 82 accompanies the print controller 80, the image memory 74 may also serve as the image buffer memory 82. Also possible is an aspect in which the print controller 80 and the system controller 72 are integrated to form a single processor.

The head driver 84 drives the pressure generating devices of the print heads 50 of the respective colors on the basis of print data supplied by the print controller 80. The head driver 84 can be provided with a feedback control system for maintaining constant drive conditions for the print heads.

Similarly to the head driver 84, the treatment liquid head driver 86 drives the ejection driving actuators of the treatment liquid head 12S on the basis of the dot data supplied from the print controller 80, in such a manner that treatment liquid is ejected onto prescribed positions on the recording paper 16.

The solvent removal amount control device 88 controls the amount of solvent removed by controlling the porous roller 26, which forms the solvent removing device. As a concrete control method of the porous roller 26, there are a method where various porous rollers 26 are switched, a method where the distance between the porous roller 26 and the liquid droplets deposited on the recording paper 16 is changed, a method where the pressure (contact pressure) of the porous roller 26 on the deposited liquid droplets (recording paper 16) is changed, and the like. These are described in more detail below.

The curing device driver 90 drives the radiation source 28 forming the curing device, in such a manner that radiation is irradiated onto the ink droplets after removal of the solvent, thereby curing the coloring material aggregate and the solvent component remaining after solvent removal.

Furthermore, the inkjet recording apparatus 10 comprises a media determination unit 96. The media determination unit 96 determines the type and size of the recording paper 16. There are no particular restrictions on the media determination unit 96. For example, a device for reading in information such as a barcode attached to the magazine 32 of the paper supply unit 18, or sensors disposed at a suitable position in the paper conveyance path (e.g., a paper width determination sensor, a sensor for determining the thickness of the paper, a sensor for determining the reflectivity of the paper, and so on) can be used, and a suitable combination of these elements may also be used. Furthermore, it is also possible to adopt a composition in which information relating to the paper type, size, or the like, is specified according to inputs made via a prescribed user interface, instead of or in conjunction with such automatic determination devices.

The information acquired by the media determination unit 96 is sent to the system controller 72 and the print controller 80, and is used for the ejection control of the treatment liquid and ink, the control of solvent removal amount, and the like.

The image data to be printed is externally inputted through the communications interface 70, and is stored in the image memory 74. At this stage, RGB image data is stored in the image memory 74, for example. The image data stored in the image memory 74 is sent to the print controller 80 through the system controller 72, and is converted to the dot data for each ink color by a commonly known image processing method, such as the dither-method or the error diffusion method, in the print controller 80.

The print heads 12BK, 12M, 12C, and 12Y are driven on the basis of the dot data thus generated by the print controller 80, and ink is ejected from the print heads 12BK, 12M, 12C, and 12Y. By controlling ink ejection from the print heads 12BK, 12M, 12C, 12Y in synchronization with the conveyance speed of the recording paper 16, an image is formed on the recording paper 16. Furthermore, the treatment liquid is ejected from the treatment liquid head 12S onto the ink ejection positions prior to ink ejection, the ink coloring material and solvent are separated by reaction between the ink and treatment liquid, and the solvent is removed from the ink droplets on the recording paper 16 by means of the solvent removal method described below.

Next, a method for removing solvent from the ink droplets on the recording paper 16 will be described.

As shown in FIG. 1, in terms of the paper conveyance direction (the right to left direction in FIG. 1), the treatment liquid head 12S is disposed before the print heads 12BK, 12M, 12C and 12Y, and the porous roller 26 is disposed after the print heads 12BK, 12M, 12C and 12Y. The treatment liquid head 12S has a similar composition to the print heads 12BK, 12M, 12C and 12Y, and ejects the treatment liquid onto the recording paper 16 from the nozzles of the treatment liquid head 12S.

Figure 7:
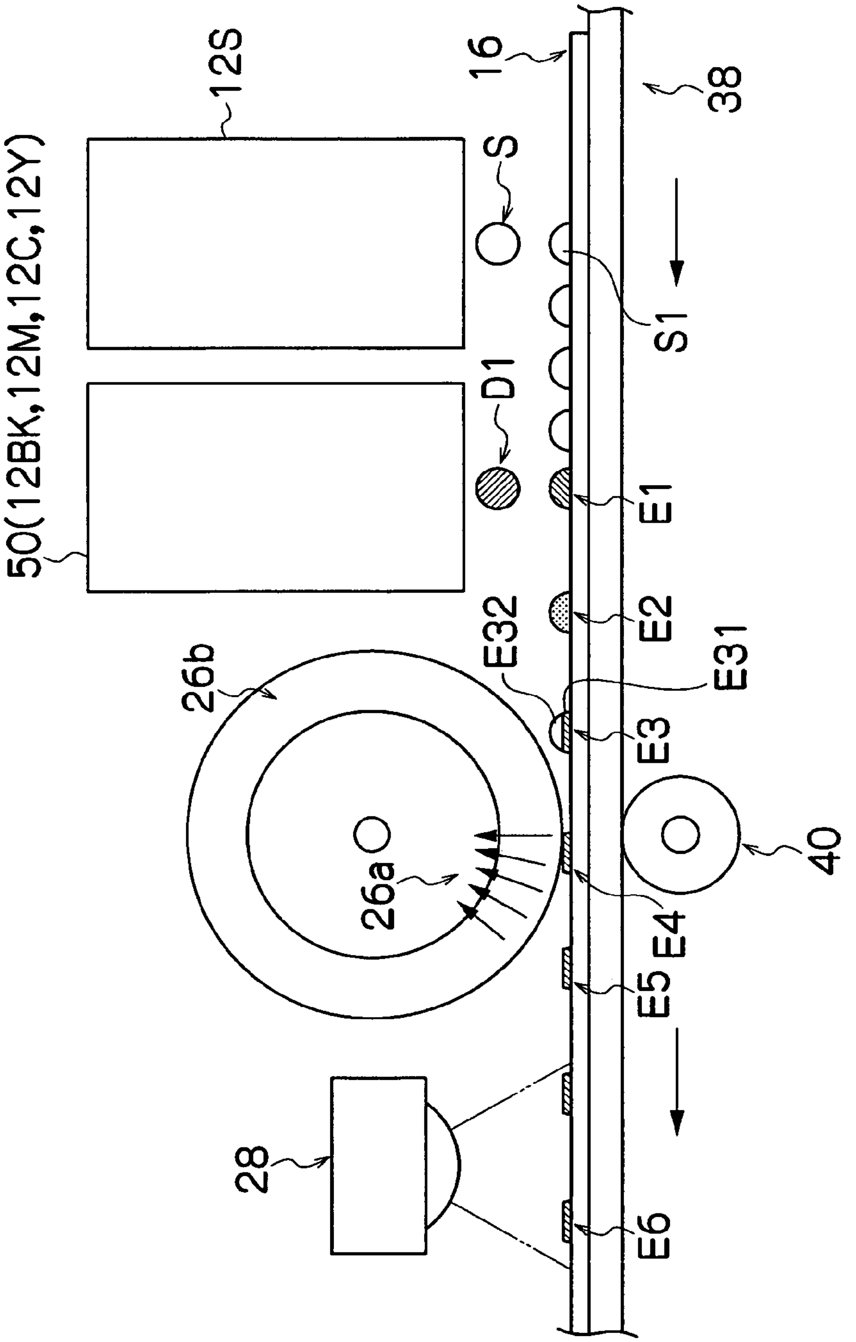
FIG. 7 is an enlarged diagram of the periphery of the print unit 12 and the porous roller 26.

FIG. 7 is an enlarged diagram of the periphery of the print unit 12 and the porous roller 26. In FIG. 7, the print heads 12BK, 12M, 12C and 12Y, in particular, are represented as one print head 50.

As shown in FIG. 7, the treatment liquid head 12S ejects droplets of the treatment liquid S onto the droplet ejection positions on the recording paper 16 where the ink droplets are to be deposited by the print head 50, before the print head 50 ejects the ink.

Treatment liquid droplets S1 ejected onto the recording paper 16 from the treatment liquid head 12S land on the recording paper 16 and are transported to a position directly below the print head 50 by the conveyance of the recording paper 16 in the paper conveyance direction indicated by the arrow in FIG. 7. When the print position comes directly below the print head 50 because of the conveyance of the recording paper 16, ink droplets D1 are ejected from the print head 50 so as to land in an overlapping fashion directly on the treatment liquid droplets S1 on the recording paper 16.

Thereby, a mixed liquid droplet E1 in which the treatment liquid and the ink are mixed is formed on the recording paper 16.

The treatment liquid used in the present embodiment has properties of generating aggregate of the coloring material when it is combined with the ink. Therefore, the coloring material component aggregates by reaction between the two liquids of the treatment liquid and the ink, as indicated by the mixed liquid droplet E2.

As means for generating aggregate of the coloring material, there are methods such as reacting an anionic coloring material with a cationic compound, inducing dispersive breakdown of a pigment-based ink by changing the pH, inducing dispersive breakdown of a pigment-based ink by reaction with a multivalent metallic salt, and the like.

As shown by the mixed liquid droplet E3, the aggregate of coloring material thus generated sinks downward, and changes into a mixed liquid droplet E3 in which a coloring material layer E31 made of the aggregate of coloring material and a solvent layer E32 made of the solvent are separated.

The porous roller 26 has a structure in which a porous member **26*b* is disposed on the surface of a metal roller 26*a*. The porous roller 26 is disposed in such a manner that a very small gap is formed between the lowermost part of the porous roller 26 and the recording paper 16. Furthermore, the porous roller 26 rotates in the same direction as the direction of conveyance of the recording paper 16. In this case, distortion of the image due to rubbing of the ink is prevented by causing the porous roller 26 to rotate in such a manner that the relative speed with respect to the recording paper 16** is substantially zero.

The metal roller **26*a* in the inner part of the porous roller 26 has a circular cylindrical shape having a hollow internal cavity. In addition, although not shown in the drawings, a plurality of holes are formed in the sides of the metal roller 26*a*, and the interior of the metal roller 26*a* is set to a negative pressure by suctioning with a pump (not shown). Each of the pores in the porous roller 26*b*** is formed to have a sufficiently small diameter in comparison with the diameter of the aggregate of coloring material.

When the mixed liquid droplet E3 having the separated coloring material layer E31 and solvent layer E32 is moved to a position directly below the porous roller 26 because of the conveyance of the recording paper 16, then, as shown by the mixed liquid droplet E4, the solvent is progressively absorbed from the solvent layer E32 into the interior of the porous roller 26 because of the capillary action of the porous member 26*b* and the negative pressure inside the metal roller 26*a*. In this way, the majority of the separated solvent is absorbed by the porous member 26*b* of the porous roller 26. However, it is necessary to leave the necessary amount of solvent on the recording paper 16 for curing and fixing the image by irradiation of radiation at a later stage, and hence not all of the solvent is absorbed here.

Moreover, desirably, a structure is adopted which does not apply a strong pressure to the image formed on the recording paper 16 during absorbing the solvent. For example, the surface of the porous roller 26 may be made of a flexible material, and/or the auxiliary roller 40 opposing the porous roller 26 may be made of a flexible material. It is also possible to adopt a structure in which the auxiliary rollers are disposed just before and/or just after a position directly below the porous roller 26, without disposing an auxiliary roller 40 directly below the porous roller 26, in such a manner that the pressure generated when the porous roller 26 presses against the recording paper 16 is alleviated by bending of the conveyance belt 38.

As a result of absorbing the solvent by means of the porous roller 26, the mixed liquid droplet E4 becomes a mixed liquid droplet E5 including the aggregate of the coloring material and a small amount of residual solvent component (e.g., UV-curable monomer, or the like), and thus almost all of the mixed liquid droplet E5 is constituted by the coloring material aggregate.

Next, radiation from the radiation source 28 is irradiated onto the mixed liquid droplet E5 comprising the coloring material aggregate and the small amount of residual solvent component, thereby curing being performed. For example, if the ink used is the UV-curable ink and the solvent component is a UV-curable monomer, then an ultraviolet light source is used as the radiation source 28 and the ink can be cured by irradiating ultraviolet light (radiation). Consequently, a mixture E6 that is cured and leveled is obtained. In this way, the thickness of the ink is leveled and relief effects can be reduced.

The solvent component absorbed by the porous roller 26 is absorbed into the interior of the porous roller 26 due to the negative pressure, is gathered via a gathering path provided inside the roller, and is accumulated in an external accumulating unit. Desirably, impurities are removed from the liquid solvent component thus gathered, by means of a filter or the like. Moreover, desirably, the monomer component in the gathered solvent is separated by centrifugal separation, chemical separation, or the like. Furthermore, desirably, an ink component such as coloring material is then added to the solvent, in such a manner that the solvent is reused for new ink. Thus, for example, it is possible to remove impurities from the gathered solvent, separate the monomer component from the solvent, and then add an ink component to the solvent.

Furthermore, in absorbing and removing the solvent by the porous roller 26, the amount of solvent removed may be controlled by making it possible to change the distance between the porous roller 26 and the recording paper 16. In this case, it is preferable to control the distance between the porous roller 26 and the recording paper 16 (solvent) depending on the type of recording paper 16, the amount of solvent ejected, the conveyance speed, or the like.

As a method for controlling the amount of solvent removed, there are a method which varies and controls the distance between the porous roller 26 and the recording paper 16, a method which changes and controls the contact pressure of the porous roller 26 against the recording paper 16, and a method which controls the contact length (contact surface area) and/or the contact duration between the medium absorbing member and the recording paper 16.

Figure 8A:
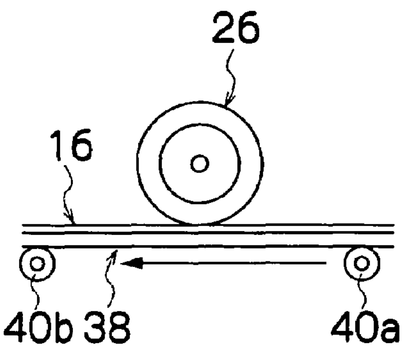
FIGS. 8A and 8B are illustrative diagrams showing a mode of controlling the pressure between a porous roller and the recording paper.
Figure 8B:
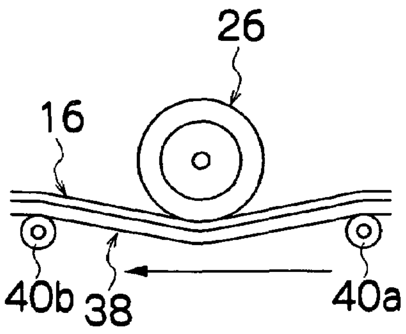

FIGS. 8A and 8B show methods for controlling the amount of solvent removed by controlling the contact pressure of the porous roller 26 against the recording paper 16.

The porous roller 26 is movable in the vertical direction by means of a movement mechanism (not shown in the drawing), and the contact pressure of the porous roller 26 against the recording paper 16 can be controlled by moving the porous roller 26 upward and downward. In this case, as shown in FIGS. 8A and 8B, rather than disposing an auxiliary roller at a position directly below the porous roller 26 on the lower side of the conveyance belt 38, auxiliary rollers 40*a* and 40*b* are disposed respectively on the upstream side and the downstream side with respect to a position directly below the porous roller 26. Accordingly, when the porous roller 26 moves downwards, the conveyance belt 38 and the recording paper 16 are bent toward the lower side due to the contact pressure of the porous roller 26. Consequently, the contact length (contact surface area) between the porous roller 26 and the recording paper 16 is increased, and the contact duration is also increased.

FIG. 8A shows a case where the pressure between the porous roller 26 and the recording paper 16 is relatively low. When the pressure is low as in this case, the conveyance belt 38 and the recording paper 16 move in an almost directly horizontal direction, and the contact length (contact surface area) between the porous roller 26 and the recording paper 16 (solvent) is relatively small.

On the other hand, FIG. 8B shows a case where the pressure between the porous roller 26 and the recording paper 16 is relatively high. When the pressure is high as in this case, the conveyance belt 38 and the recording paper 16 bend toward the lower side, and the contact length (contact surface area) between the porous roller 26 and the recording paper 16 (solvent) becomes larger. Because of the increased length of contact, the duration of contact also increases and the amount of solvent absorbed is raised.

Figure 9A:
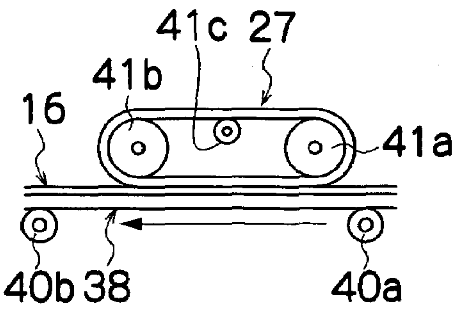
FIGS. 9A and 9B are illustrative diagrams showing a mode of controlling the pressure between the contact length between a porous belt and the recording paper.
Figure 9B:
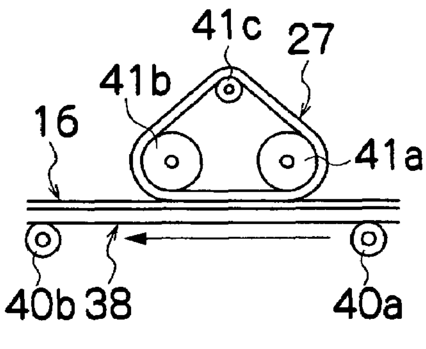

Moreover, FIGS. 9A and 9B show examples of controlling the contact length by means of a porous belt, rather than a porous roller.

As shown in FIGS. 9A and 9B, in these examples, instead of a porous roller 26, a porous belt 27 wound around three rollers 41*a*, 41*b*, and 41*c* is used. The surface of this porous belt 27 is constituted by a porous solvent absorbing member, and the porous belt 27 rotates in the opposite direction to the conveyance belt 38, in such a manner that the portion of the porous belt 27 that makes contact with the recording paper 16 on the conveyance belt 38 moves in the same direction as the recording paper 16.

Furthermore, the rollers 41*a* and 41*b* are respectively movable in the leftward and rightward directions, and the roller 41*c* is movable in the upward and downward directions, in such a manner that the distances between the rollers can be adjusted.

FIG. 9A shows a state where the roller 41*c* is disposed at a bottom position and the distance between the roller 41*a* and roller 41*b* is a maximum. In this case, the contact length (contact surface area) between the porous belt 27 and the recording paper 16 is a maximum.

On the other hand, in FIG. 9B, the roller 41*c* has moved upward, the roller 41*a* and the roller 41*b* have moved so as to reduce the distance therebetween, and the contact length (contact surface area) between the porous belt 27 and the recording paper 16 has reduced.

In this way, by controlling the contact length (contact surface area) between the porous belt 27 and the recording paper 16, the contact duration is also controlled, and hence the amount of solvent removed is controlled. Furthermore, the contact duration can also be controlled by controlling the conveyance speed. The above-described devices for controlling the distance, pressure, contact length, or the like, correspond to the solvent removal amount control device 88 in FIG. 6.

Furthermore, in the embodiment described above, one treatment liquid head 12S is disposed before the print heads 12BK, 12M, 12C and 12Y, and one porous roller 26 is disposed after the print heads 12BK, 12M, 12C and 12Y However, the disposition of the treatment liquid head 12S and the porous roller 26 is not limited to this composition.

Figure 10:
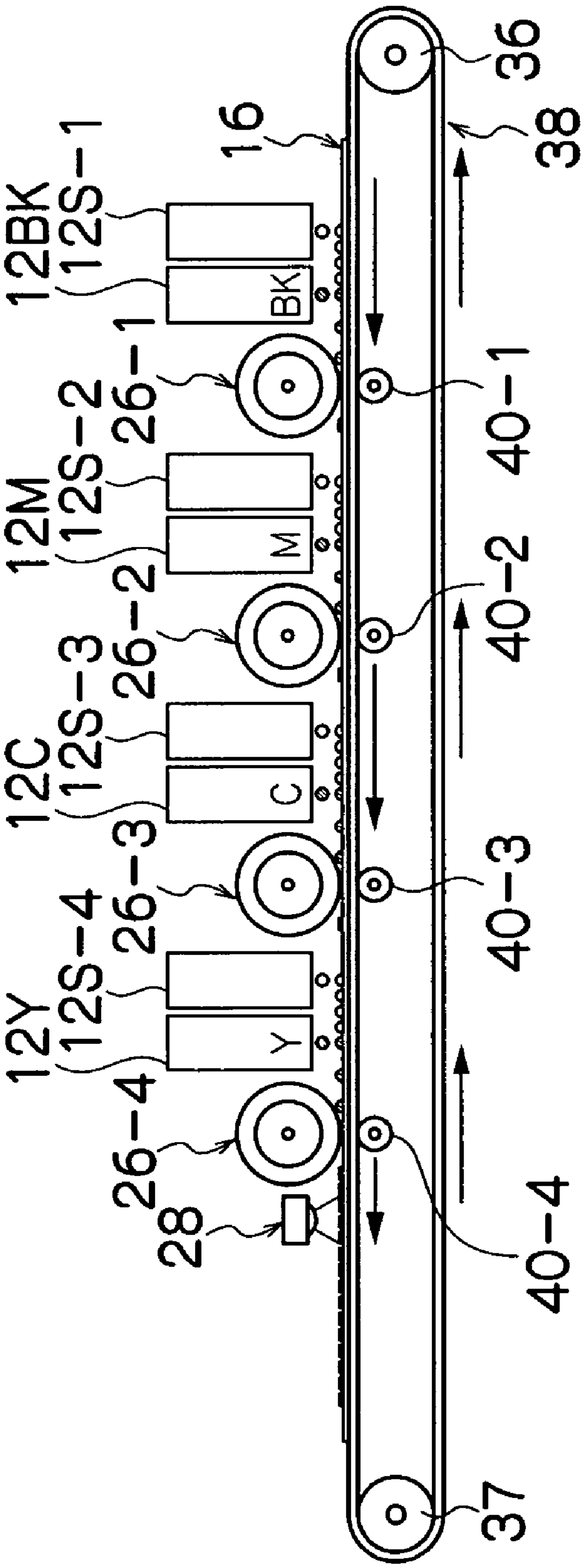
FIG. 10 is a schematic drawing showing a further example of an inkjet recording apparatus according to the first embodiment.

For example, as shown in FIG. 10, it is also possible to provide treatment liquid heads 12S-1, 12S-2, 12S-3 and 12S-4 and porous rollers 26-1, 26-2, 26-3 and 26-4 before and after the print heads 12BK, 12M, 12C and 12Y, respectively. Auxiliary rollers 40-1, 40-2, 40-3, and 40-4 are disposed at a position directly below the porous rollers.26-1, 26-2, 26-3 and 26-4, respectively, on the lower side of the conveyance belt 38. When a composition of this kind is adopted, with respect to each color of ink, firstly a treatment liquid is ejected, and then colored ink is ejected. Next, the solvent in that colored ink is removed immediately after ejecting the colored ink. Then, radiation from the radiation source 28 is irradiated, thereby curing the respective aggregates of coloring material and the residual solvent components.

As described above, according to the present embodiments, the coloring material and the solvent (e.g., UV-curable monomer) in the radiation-curable ink are separated, the solvent is removed by being absorbed by the porous member, and thus, the amount of solvent can be reduced. Hence, the thickness of the ink can be reduced and a flat printed image can be obtained, without degrading print density or lowering resolution due to broadening of dot diameters or line widths. Consequently, relief effects can be reduced.

Moreover, as a method for separating the coloring material and the solvent, a two-liquid reaction, such as the breakdown of the dispersed state of a pigment by means of acid or metal ions, or the formation of aggregate of dye or pigment by means of an anionic or cationic reaction, is used. Therefore, the coloring material and the solvent can be quickly separated, and hence it becomes possible to remove the solvent alone.

Next, a second embodiment of the present invention will be described.

The first embodiment described above separates the coloring material component and the solvent by using aggregation due to the two-liquid reaction between the ink and the treatment liquid. On the other hand, in this second embodiment, the coloring material component and the solvent are separated by using an electrophoresis effect generated by applying an electric field.

Figure 11:
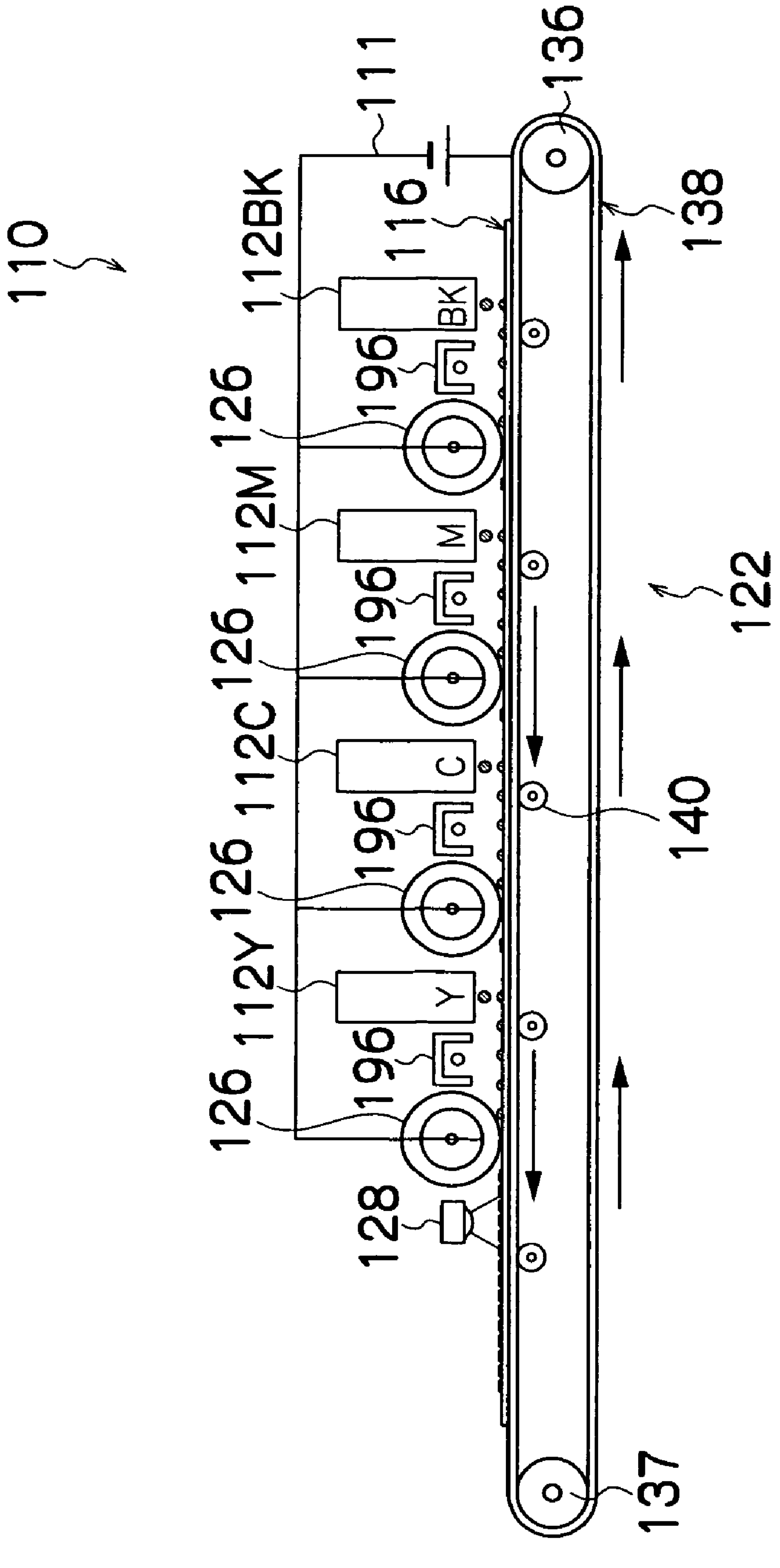
FIG. 11 is a general compositional diagram showing an schematic view of a second embodiment of an inkjet recording apparatus forming an image forming apparatus relating to the present invention.

FIG. 11 is a general schematic drawing of an inkjet recording apparatus serving as an image forming apparatus relating to the second embodiment. In FIG. 11, only the section which prints an image, the section which removes solvent, and the section which performs curing are shown, and sections such as the paper supply unit, the paper output unit, the ink storing and loading unit, and the like, are omitted from the drawing.

As shown in FIG. 11, the inkjet recording apparatus 110 according to the present embodiment comprises a plurality of print heads 112BK, 112M, 112C and 112Y provided respectively for colors of ink, and a belt conveyance unit 122, which conveys recording paper 116 while the recording paper 116 is kept flat.

Similarly to the first embodiment, the ink used here is a radiation-curable ink, which hardens when irradiated with radiation, such as ultraviolet (UV) light or an electron beam (EB). Furthermore, the belt conveyance unit 122 is disposed so as to oppose the nozzle surface of the print heads 112BK, 112M, 112C, and 112Y A corona charger 196 and a porous roller 126 are disposed after each of the print heads 112BK, 112M, 112C, and 112Y, as shown in FIG. 11. The corona charger 196 charges ink droplets ejected and deposited on the recording paper 116, and the porous roller 126 absorbs and removes the solvent component of the ink droplets. Furthermore, one radiation source 128 emitting radiation to cure the ink droplets is disposed after the print heads.

The belt conveyance unit 122 has a structure in which an endless electrostatic attraction belt (conveyance belt) 138 is wound around rollers 136 and 137. Auxiliary roller 140 is disposed at a position below the porous roller 126 on the lower side of the conveyance belt 138.The electrostatic attraction belt 138 is made of a conducting member, and is electrically connected to a DC power source 111. The other end of the DC power supply 111 is electrically connected to the porous rollers 126. When a DC voltage is applied by the DC power source 111, an electric field is applied between the electrostatic attraction belt 138 and the porous roller 126, and the recording paper 116 is attracted to and held onto the electrostatic attraction belt 138 by means of an electrostatic force of attraction.

By transmitting the driving force of a motor (not shown) to at least one of the rollers 136 and 137 around which the electrostatic attraction belt 138 is wound, the electrostatic attraction belt 138 is driven in the counterclockwise direction in FIG. 11, and hence the recording paper 116 held on the electrostatic attraction belt 138 is conveyed from right to left in FIG. 11.

The composition of the print heads 112BK, 112M, 112C, and 112Y is similar to that of the first embodiment described above. A color image is formed on the recording paper 116 by ejecting inks of respective colors from the print heads 112BK, 112M, 112C, and 112Y, while the recording paper 116 is conveyed by means of the electrostatic attraction belt 138.

The coloring material component of the ink droplets ejected onto the recording paper 116 from the print heads 112BK, 112M, 112C and 112Y is electrically charged by the corona charger 196, and the coloring material component and the solvent component are separated by the porous roller 126, by using an electrophoresis effect, in such a manner that only the solvent component is absorbed and removed. Subsequently, the coloring material component and the residual solvent component are cured by being irradiated with radiation from the radiation source 128 at a downstream stage.

Below, the separation and the removal of the solvent by using the electrophoresis effect will be described.

Figure 12:
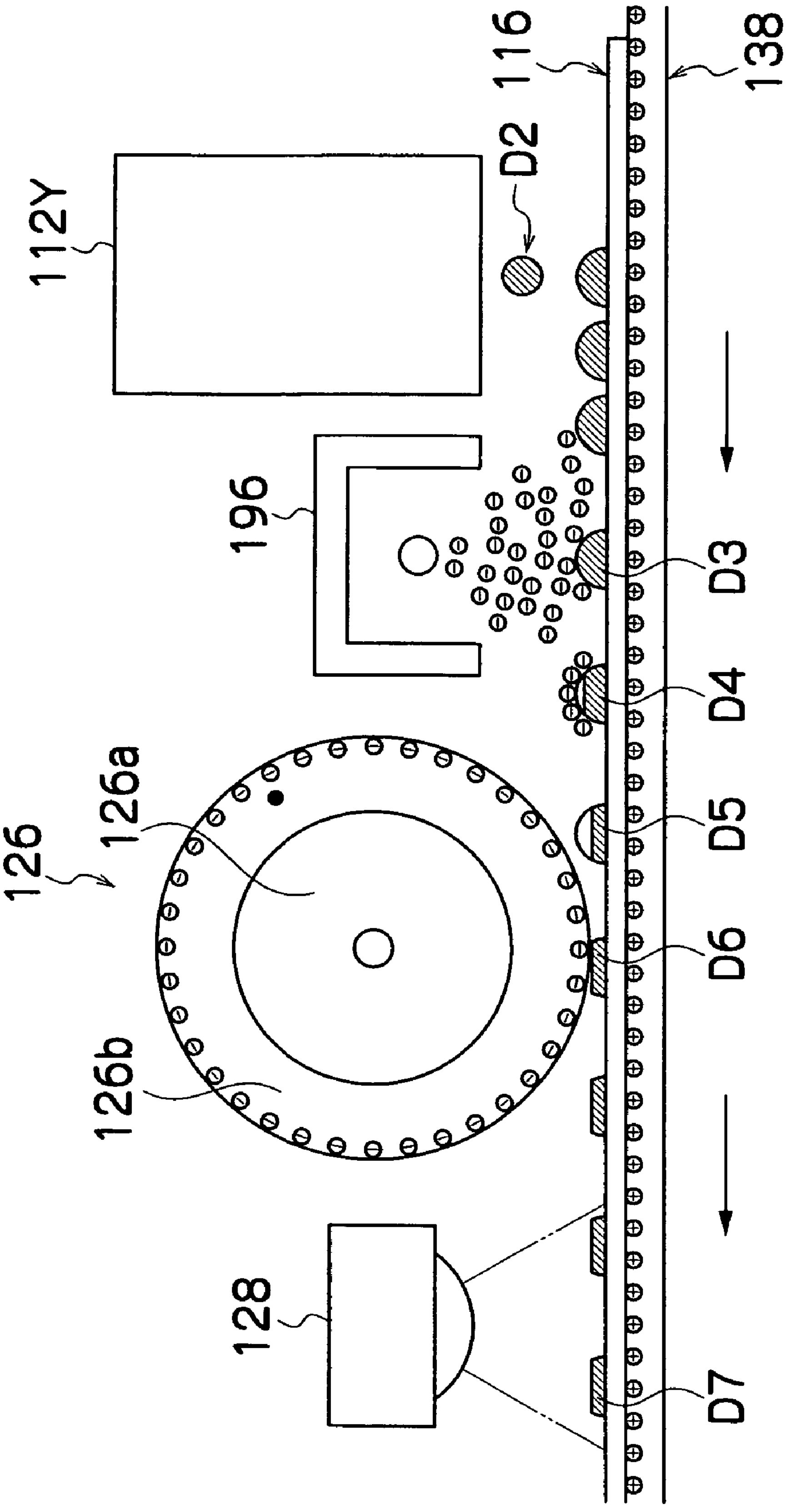
FIG. 12 is an enlarged diagram showing the periphery of a corona charger and a porous roller according to the second embodiment.

FIG. 12 is an enlarged diagram of the peripheral sections of a corona charger 196 and a porous roller 126.

The composition of the respective print heads 112BK, 112M, 112C, and 112Y is similar, and the composition relating to print head 112Y is described in particular in FIG. 12. As stated above, an electric field is applied between the electrostatic attraction belt 138 and the porous roller 126, by the DC power source 111 (see FIG. 11). For example, as shown in FIG. 12, the electrostatic attraction belt 138 is charged positively, and the porous roller 126 is charged negatively.

An ink droplet D2 is ejected from the print head 112Y onto the recording paper 116, and is moved from right to left in FIG. 12, as the recording paper 116 is conveyed. When the ink droplet comes to a position below the corona charger 196, the coloring material component of the ink droplet D3 which is charged negatively because of the charging action of the corona charger 196 moves reliably toward the recording paper side.

As shown by the ink droplet D4 in FIG. 12, the coloring material component in the ink droplet D4 is negatively charged, and the electrostatic attraction belt 138 has a positive charge. Consequently, this coloring material component is subjected to an electrostatic attraction which draws this coloring material component toward the electrostatic attraction belt 138. Therefore, the coloring material component sinks downward and separates from the solvent.

Furthermore, as the ink droplet is conveyed further and approaches the porous roller 126 more closely as indicated by ink droplet D5, the porous roller 126 also has a negative charge, and hence the negatively charged coloring material component is induced to descend more effectively because of the electrostatic force of repulsion. Hence, the coloring material component and the solvent component are reliably separated.

As shown by the ink droplet D6, the solvent component is absorbed by the porous member 126*b* formed on the surface of the porous roller 126. In this case, the electrostatic attraction belt 138 is charged to the opposite polarity to the coloring material component, and the porous roller 126 is charged to the same polarity as the coloring material component. Consequently, the coloring material component is impeded from moving toward the porous roller 126 when the porous roller 126 absorbs the solvent component, and therefore adhesion of coloring material component to the surface of the porous roller 126 can be prevented even more reliably.

Subsequently, radiation is emitted by the radiation source 128, and the ink droplet D7 is cured and fixed. The solvent component gathered in the inside 126*a* of the porous roller 126 can be reused, similarly to the first embodiment described above.

According to the present embodiment, by charging the coloring material component with the corona charger 196 and using an electrophoresis effect, the coloring material component and the solvent component can be reliably separated, without using the treatment liquid.

In the present embodiment, since the coloring material and the solvent are separated by using the electrophoresis effect in this way, it is possible to perform separation without using the treatment liquid. Moreover, it is also possible to prevent adhesion of the coloring material to the solvent absorbing member, by gathering the aggregate of coloring material on the side close to the recording paper.

Moreover, in either of the embodiments described above, the absorbed solvent is gathered, reprocessed by a separate apparatus, and reused for recycled ink, or is reused for ink by adding coloring material in the same apparatus. Therefore, it is possible to reduce the cost of the solvent, such as UV-curable monomer, which is relatively expensive, and to reduce unwanted waste products.

In addition to the embodiments described above, for example, it is also possible to separate a UV-curable monomer and/or oligomer component in a water-based UV-curable ink from water, the monomer and oligomer being cured and the residual water being removed by irradiation of ultraviolet light. Alternatively, it is possible to perform UV-curing after the water is removed from the ink in the separated state.

Although the image forming apparatus and the image forming method according to the present invention were described in detail above, the present invention is not limited to these examples.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming apparatus, comprising:

an ink ejection device which ejects a droplet of radiation-curable ink onto a recording medium;

a solvent separating device which separates a coloring material component from a solvent component in the droplet of the radiation-curable ink on the recording medium by using an electrophoresis effect;

a solvent removing device which removes the solvent component separated by the solvent separating device; and a curing device which irradiates radiation onto the droplet of the radiation-curable ink after the solvent component is removed by the solvent removing device, in such a manner that the droplet of the radiation-curable ink is cured, wherein the solvent separating device includes:

an electrically charging device which electrically charges the droplet of the radiation-curable ink on the recording medium;

a recording medium holding member on which the recording medium is held; and an electric field application device which applies an electric field to the electrically charged droplet on the recording medium held on the recording medium holding member, the electric field application device having a DC power source which is electrically connected to the solvent removing device and the recording medium holding member and applies a DC voltage between the solvent removing device and the recording medium holding member.

2. The image forming apparatus as defined in claim 1, wherein the solvent removing device comprises a porous member which absorbs the solvent component.

3. The image forming apparatus as defined in claim 1, further comprising a solvent removal amount control device which controls an amount of the solvent component removed by the solvent removing device.

4. The image forming apparatus as defined in claim 3, wherein the solvent removal amount control device controls a distance between the solvent removing device and the recording medium.

5. The image forming apparatus as defined in claim 3, wherein the solvent removal amount control device controls a contact pressure between the solvent removing device and the recording medium.

6. The image forming apparatus as defined in claim 3, wherein the solvent removal amount control device controls at least one of a contact length and a contact duration between the solvent removing device and the recording medium.

7. The image forming apparatus as defined in claim 1, wherein the solvent separating device forms aggregate of the coloring material in the droplet of the radiation-curable ink on the recording medium, by means of a two-liquid reaction.

8. An image forming method, comprising the steps of:

ejecting a droplet of radiation-curable ink onto a recording medium;

separating a coloring material component from a solvent component in the droplet of the radiation-curable ink on the recording medium by using an electrophoresis effect;

removing the solvent component separated in the separating step by a solvent removing device; and irradiating radiation onto the droplet of the radiation-curable ink after the removing step, in such a manner that the droplet of the radiation-curable ink is cured, wherein the separating step includes the steps of:

electrically charging the droplet of the radiation-curable ink on the recording medium;

holding the recording medium on a recording medium holding member; and applying an electric field to the electrically charged droplet on the recording medium held on the recording medium holding member, by applying a DC voltage between the solvent removing device and the recording medium holding member by a DC power source which is electrically connected to the solvent removing device and the recording medium holding member.

9. An image forming method, comprising the steps of:

ejecting a droplet of radiation-curable ink onto a recording medium;

separating a coloring material component and a solvent component in the droplet of the radiation-curable ink on the recording medium;

removing the solvent component separated in the separating step;

irradiating radiation onto the droplet of the radiation-curable ink after the removing step, in such a manner that the droplet of the radiation-curable ink is cured;

gathering the solvent component removed in the removing step; and adding a coloring material component to the solvent component gathered in the gathering step for reusing for new ink.

* * * * *